(No Model.)
J. KAUFFMAN.
DRAFT EQUALIZER.
No. 417,190. Patented Dec. 10, 1889.
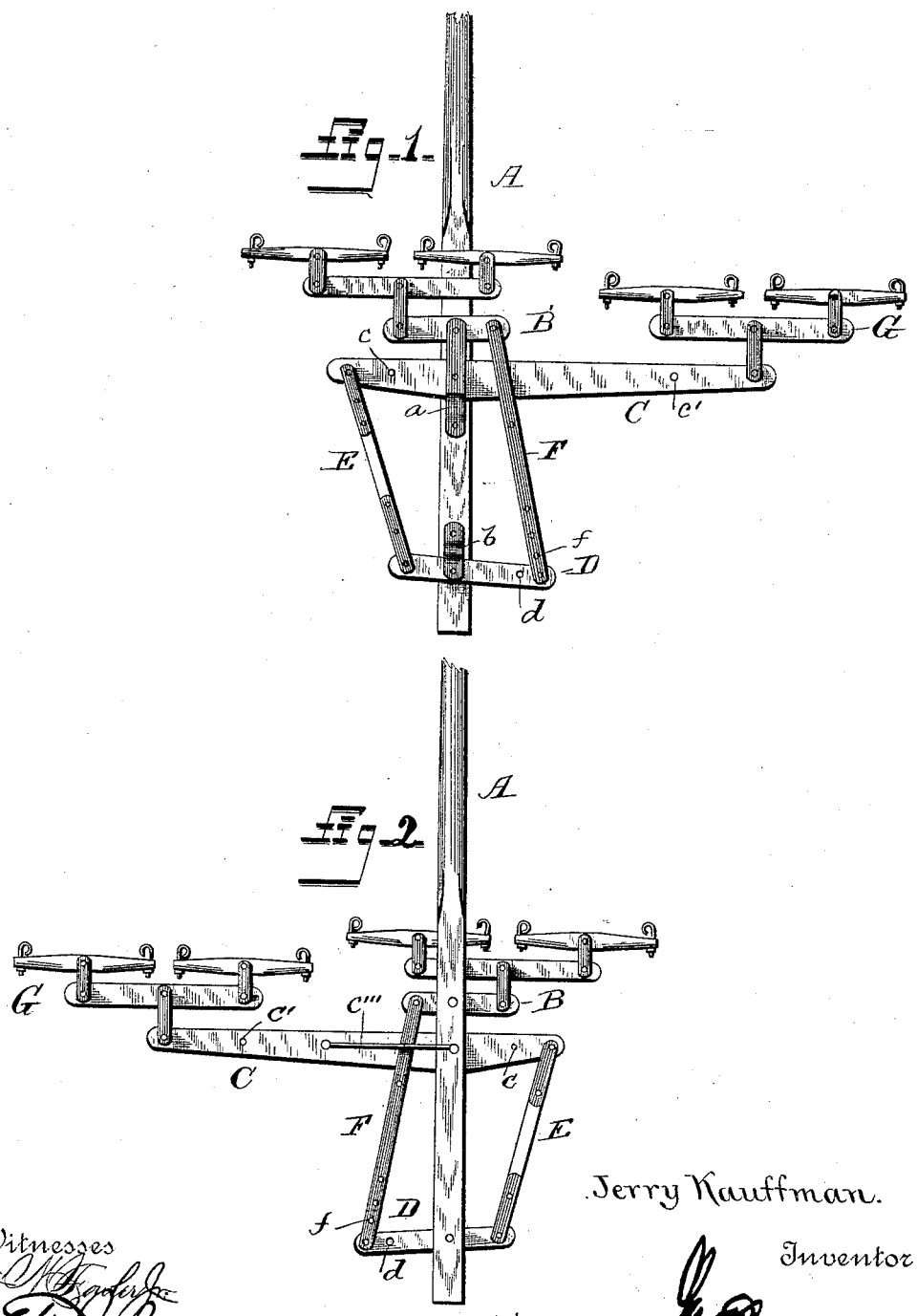
Jerry Kauffman.
Inventor

UNITED STATES PATENT OFFICE.

JERRY KAUFFMAN, OF WELLMAN, IOWA.

DRAFT-EQUALIZER.

SPECIFICATION forming part of Letters Patent No. 417,190, dated December 10, 1889.

Application filed October 12, 1889. Serial No. 326,778. (No model.)

*To all whom it may concern:*

Be it known that I, JERRY KAUFFMAN, a citizen of the United States of America, residing at Wellman, in the county of Washington and State of Iowa, have invented certain new and useful Improvements in Draft-Equalizers; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to certain new and useful improvements in draft-equalizers; and it consists in the construction and combination of the parts, as will be hereinafter fully set forth, and particularly pointed out in the claims.

In the accompanying drawings, Figure 1 is a plan view of the upper side of the draft-equalizer, and Fig. 2 is a plan view of the under side of the same.

A represents the pole of a vehicle or agricultural implement, the upper edge of the portion to which the equalizer is attached being on the same plane, while the sides and lower edge may be of any ordinary construction. To the upper side of the pole are pivoted by means of bolts which pass through straps *a b* levers B, C, and D. These levers are pivoted to the pole to have long and short ends, as shown. The rear lever D has near its long end a perforation *d*, as well as end perforations, and this lever D is connected to the short end of the long or central lever C and to the short end of the front lever B by connecting-bars E and F, the connecting-bar F having an opening or slot, which is formed by the re-enforcing-straps thereof, through which the long end of the lever C passes. The long end of the lever C is supported in a horizontal position by a brace-rod $C^3$, which is pivoted thereto and to the under side of the pole. The connecting-bars E and F are provided with plates or straps, as shown, which are attached to the upper and lower sides of the bars. The rear end of the connecting-bar F has a perforation *f* in its rear end, by means of which it can be adjusted or shortened. The lug or central lever C, which is pivoted to the pole, has a perforation *c* near the short end thereof and a similar perforation *c'* near the long end. The front end of the connecting-bar E may be secured in the perforation *c*, while the doubletree G can be secured in the perforation *c'*. These adjustments can be made to change the relative positions of the doubletrees or when it is desirable to dispense with one of the doubletrees and use the equalizer for three horses instead of four, in which case one of the singletrees will be attached to the long end of the lever B. It will be noted that the levers B, C, and D are pivoted immediately above the upper surface of the pole, so that they will be on the same plane, and these levers are of substantially the same thickness, though of different lengths. It will also be observed that the distances from the pivot of the rear lever to the perforation *d* is the same as the distance from the pivot of the long lever C to the perforation *c*, as well as from the perforation *c'* to the pivot of the strap which connects the doubletree G thereto. Thus the device may be organized as a three-horse equalizer without the addition of other parts or destroying the proportions thereof, while the fulcrums are permanent. By adjusting the connecting-bars E and F the length of the levers can be changed, so that the draft can be equalized upon the doubletrees, or so that more power will have to be applied to one of the doubletrees than the other, as may be desired. The lever B is pivoted or has its fulcrum immediately in front of the long lever C, and should excessive power be applied to either of the doubletrees, as is often the case, one end of this lever will abut against the front edge of the lever C so as to prevent excessive movement of any of the parts, and when the excess of power is removed the levers will, when the power becomes normal, resume their proper positions.

I am aware that prior to my invention draft-equalizers for three or four horses have been made, said devices having a long lever and a lever pivoted rear of the same with suitable connecting-bars, and I do not therefore claim such, broadly; but

What I claim as new, and desire to secure by Letters Patent, is—

1. In a draft-equalizer, the combination of the pole, levers B, C, and D, fulcrumed so as to be on the same plane with each other, bars E F, connecting the lever D to the short ends of levers B C, and doubletrees attached to the long ends of said levers B C, substantially as shown, and for the purpose set forth.

2. In a draft-equalizer, the combination, with a pole, of levers B, C, and D, having arms of unequal lengths, said levers each being pivoted to the upper side of the pole on the same horizontal plane with each other, bars E F, for connecting the short ends of the front levers B C to the arms of the rear lever D, doubletrees connected to the long arms of the levers B C, the lever C having perforations $c\ c'$, and perforations $d$ and $f$ in the lever D, and connecting-bar F, the parts being organized substantially as shown, and for the purpose set forth.

3. In a draft-equalizer comprising a pole, levers B C D, connecting-bars E F, and doubletrees, the lever B being pivoted immediately in front of the lever C, so that the ends thereof will contact with the front edge of the lever C and prevent undue pivotal movement of the parts, substantially as shown, and for the purpose set forth.

In testimony whereof I affix my signature in presence of two witnesses.

JERRY KAUFFMAN.

Witnesses:
H. G. MOORE,
J. W. GEMMILL.